(12) United States Patent
Kim (10) Patent No.: US 12,223,619 B2
(45) Date of Patent: Feb. 11, 2025

(54) IMAGE PROCESSING APPARATUS, IMAGE PROCESSING METHOD, AND DISPLAY APPARATUS BASED ON THE SAME

(71) Applicant: LG Display Co., Ltd., Seoul (KR)

(72) Inventor: Seong Gyun Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 451 days.

(21) Appl. No.: 17/888,366

(22) Filed: Aug. 15, 2022

(65) Prior Publication Data

US 2023/0177647 A1 Jun. 8, 2023

(30) Foreign Application Priority Data

Dec. 8, 2021 (KR) .......................... 10-2021-0175018

(51) Int. Cl.
*G06T 3/4076* (2024.01)
*G06T 3/4007* (2024.01)
(Continued)

(52) U.S. Cl.
CPC .......... *G06T 3/4076* (2013.01); *G06T 3/4007* (2013.01); *G06T 3/4046* (2013.01);
(Continued)

(58) Field of Classification Search
CPC ... G06T 3/4076; G06T 3/4007; G06T 3/4046; G06T 5/50; G06T 5/70; G06T 2207/20081; G06T 2207/20084; G06T 2207/20224; G06T 5/60; G06T 3/4053; G06T 2207/10016; G06T 2207/10024; G06T 2207/20182; G06T 2207/20221; G06T 5/00; G06T 2207/10004; G06T 2207/20172; G06T 2207/20192;
(Continued)

(56) References Cited

U.S. PATENT DOCUMENTS 8,233,734 B2 * 7/2012 Zhang ................... G06T 3/4053
358/463
2007/0041663 A1 * 2/2007 Cho .................... G06V 30/2504
382/299
(Continued)

FOREIGN PATENT DOCUMENTS

CN 112767251 A * 5/2021 .......... G06T 3/4053
JP 2017175347 A * 9/2017 ............... G06T 3/40

*Primary Examiner* — Jose L Couso
(74) *Attorney, Agent, or Firm* — Morgan, Lewis & Bockius LLP (57) ABSTRACT

The present disclosure provides an image processing apparatus, and image processing method, and a display apparatus. The image processing apparatus includes a first image processor up-sampling an original low-resolution image on the basis of deep learning-based learning data to generate a first high-resolution image, a second image processor interpolating the original low-resolution image to generate a second high-resolution image, a third image processor generating a difference image between the first high-resolution image and the second high-resolution image, extracting a high frequency component from the difference image, and amplifying the extracted high frequency component, and a fourth image processor adding the amplified high frequency component to the first high-resolution image to generate a target high-resolution image.

17 Claims, 7 Drawing Sheets

(51) Int. Cl.
  *G06T 3/4046* (2024.01)
  *G06T 5/50* (2006.01)
  *G06T 5/70* (2024.01)

(52) U.S. Cl.
  CPC .................. *G06T 5/50* (2013.01); *G06T 5/70* (2024.01); *G06T 2207/20081* (2013.01); *G06T 2207/20084* (2013.01); *G06T 2207/20224* (2013.01)

(58) Field of Classification Search
  CPC . G06T 5/90; G06T 9/002; G06T 2207/20076; G06V 10/20; G06V 30/2504; G06V 10/454; G06V 10/54; G06V 10/774; G06V 10/82; G06V 20/41; G06V 30/18057; G06V 30/19173; G09G 2320/0407; G09G 2320/0435; G09G 2340/14; G09G 2370/08; G09G 5/003; G09G 5/30; H04N 7/0117; H04N 7/0127; H04N 23/951; H04N 23/48; H04N 7/0102; H04N 19/59; G06N 3/02; G06N 3/08–088; G06N 3/0445; G06N 3/0454; G06N 3/4046; G06N 7/00; G06N 7/01; G06N 20/00; G06K 7/1482; G06F 18/214; G06F 18/22; G06F 18/241; G06F 18/2415; Y10S 128/925

See application file for complete search history.

(56) References Cited

U.S. PATENT DOCUMENTS

| | | | |
|---|---|---|---|
| 2013/0028538 A1* | 1/2013 | Simske | G06T 3/4007 382/300 |
| 2018/0330474 A1* | 11/2018 | Mehta | G06T 3/4084 |
| 2018/0336662 A1* | 11/2018 | Kimura | G06T 5/70 |
| 2021/0233210 A1* | 7/2021 | Elron | G06T 3/4053 |
| 2021/0374911 A1* | 12/2021 | Kudo | G06N 3/047 |
| 2022/0076071 A1* | 3/2022 | Hiasa | G06N 20/00 |
| 2022/0198610 A1* | 6/2022 | Kulikov | G06N 3/08 |
| 2022/0207723 A1* | 6/2022 | Takeda | G06T 3/4046 |

* cited by examiner

Coring

IMAGE PROCESSING APPARATUS, IMAGE PROCESSING METHOD, AND DISPLAY APPARATUS BASED ON THE SAME

CROSS-REFERENCE TO RELATED APPLICATIONS

This application claims the benefit of the Korean Patent Application No. 10-2021-0175018 filed on Dec. 8, 2021, which is hereby incorporated by reference as if fully set forth herein.

BACKGROUND

Technical Field

The present disclosure relates to image processing technology of a display apparatus.

Discussion of the Related Art

Super-resolution (SR) technology is being continuously researched in addition to "Super Resolution from Image Sequences" by M. Irani and S. Peleg. The SR technology is to convert a low-resolution image into a high-resolution image. The SR technology is being used in various applications like a case where a high-resolution display apparatus displays a low-resolution image or a case where an image captured based on a low resolution is converted into a high-resolution image so as to decrease the cost.

In a method of converting a low-resolution image into a high-resolution image, an interpolation method based on a simple structure has been known generally, but the interpolation method has a limitation where it is unable to obtain a high-resolution image when a resolution increase ratio is high. Also, deep learning-based SR technology proposed recently has a problem where it is difficult to adjust sharpness of a high-resolution image and much time is taken in relearning for sharpness adjustment.

SUMMARY

Accordingly, embodiments of the present disclosure are directed to an image processing apparatus, an image processing method, and a display apparatus that substantially obviate one or more of the problems due to limitations and disadvantages of the related art.

An aspect of the present disclosure is to provide an image processing apparatus, an image processing method, and a display apparatus based on the same, which may freely adjust sharpness of an image without relearning in deep learning-based super-resolution (SR) technology.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, an image processing apparatus comprises a first image processor up-sampling an original low-resolution image on the basis of deep learning-based learning data to generate a first high-resolution image, a second image processor interpolating the original low-resolution image to generate a second high-resolution image, a third image processor generating a difference image between the first high-resolution image and the second high-resolution image, extracting a high frequency component from the difference image, and amplifying the extracted high frequency component, and a fourth image processor adding the amplified high frequency component to the first high-resolution image to generate a target high-resolution image.

In another aspect, an image processing apparatus comprises a first image processor generating a denoising low-resolution image where noise is removed from an original low-resolution image, a second image processor up-sampling the denoising low-resolution image on the basis of deep learning-based learning data to generate a first high-resolution image, a third image processor up-sampling the original low-resolution image on the basis of the learning data to generate a second high-resolution image, a fourth image processor weighted-averaging the first high-resolution image and the second high-resolution image to generate a third high-resolution image, a fifth image processor interpolating the denoising low-resolution image to generate a fourth high-resolution image, a sixth image processor generating a difference image between the first high-resolution image and the fourth high-resolution image, extracting a high frequency component from the difference image, and amplifying the extracted high frequency component, and a seventh image processor adding the amplified high frequency component to the third high-resolution image to generate a target high-resolution image.

In another aspect, an image processing method comprises up-sampling an original low-resolution image on the basis of deep learning-based learning data to generate a first high-resolution image, interpolating the original low-resolution image to generate a second high-resolution image, generating a difference image between the first high-resolution image and the second high-resolution image, extracting a high frequency component from the difference image, and amplifying the extracted high frequency component, and adding the amplified high frequency component to the first high-resolution image to generate a target high-resolution image.

In another aspect, an image processing method comprises generating a denoising low-resolution image where noise is removed from an original low-resolution image, up-sampling the denoising low-resolution image on the basis of deep learning-based learning data to generate a first high-resolution image, up-sampling the original low-resolution image on the basis of the learning data to generate a second high-resolution image, weighted-averaging the first high-resolution image and the second high-resolution image to generate a third high-resolution image, interpolating the denoising low-resolution image to generate a fourth high-resolution image, generating a difference image between the first high-resolution image and the fourth high-resolution image, extracting a high frequency component from the difference image, and amplifying the extracted high frequency component, and adding the amplified high frequency component to the third high-resolution image to generate a target high-resolution image.

In another aspect of the present disclosure, a display apparatus comprises the image processing apparatus.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are In the drawings.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 1:
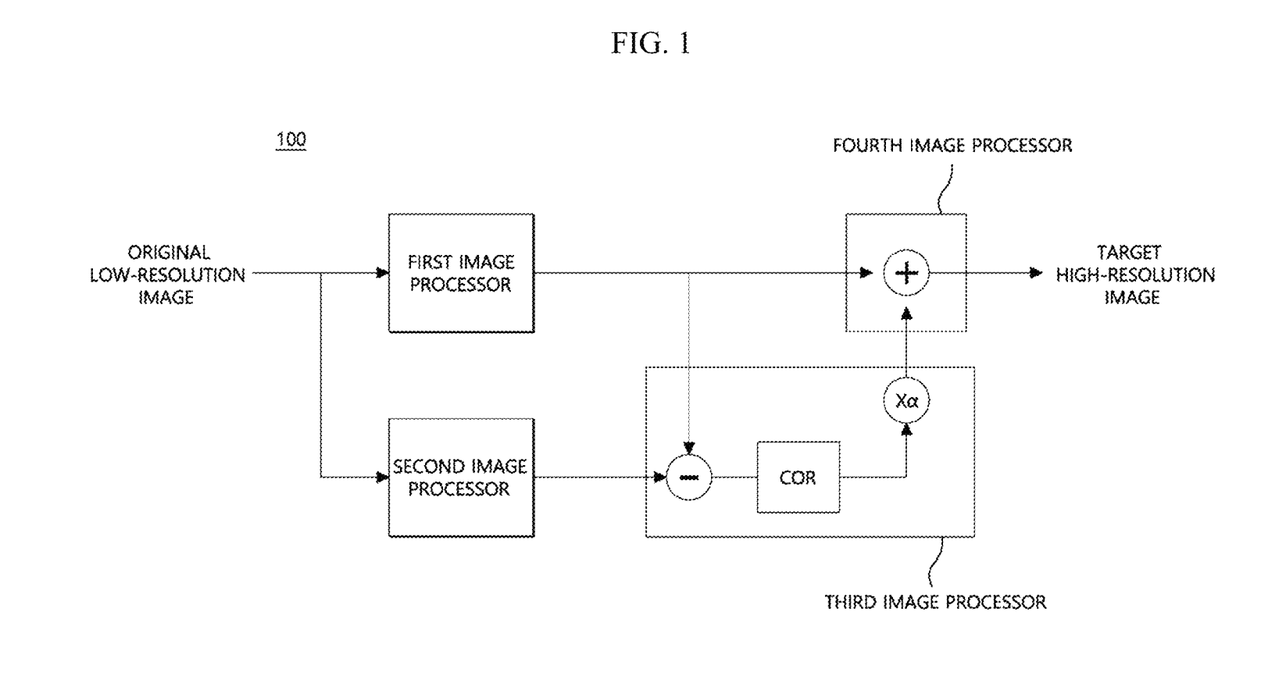
FIG. 1 is a diagram illustrating an image processing apparatus according to an embodiment of the present disclosure.
Figure 2:
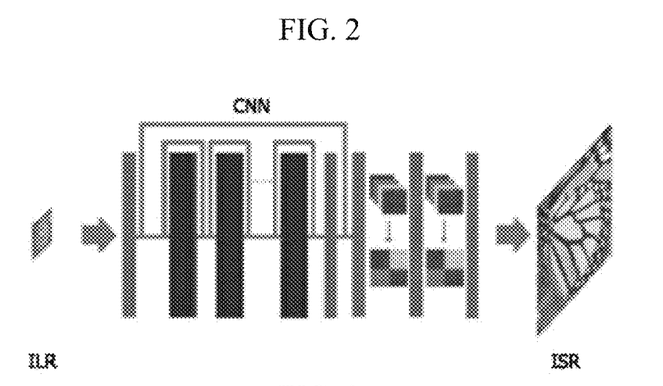
FIG. 2 is a diagram schematically illustrating deep learning-based super-resolution technology.
Figure 3:
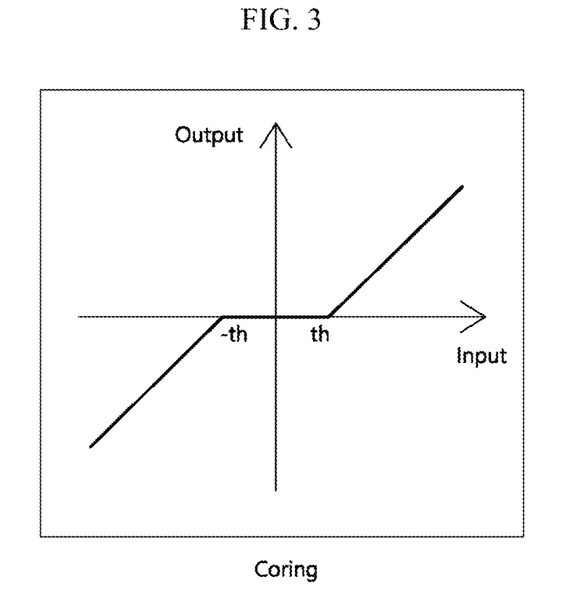
FIG. 3 is a diagram illustrating coring technology performed in a third image processor of FIG. 1.

FIG. 1 is a diagram illustrating an image processing apparatus 100 according to an embodiment of the present disclosure. FIG. 2 is a diagram schematically illustrating deep learning-based super-resolution (SR) technology. FIG. 3 is a diagram illustrating coring technology performed in a third image processor of FIG. 1.

Referring to FIG. 1, the image processing apparatus 100 according to an embodiment may be for implementing the deep learning-based SR technology, and particularly, may be for enabling sharpness of a high-resolution image to be freely adjusted without relearning.

To this end, the image processing apparatus 100 according to an embodiment may include a first image processor, a second image processor, a third image processor, and a fourth image processor and may convert an original low-resolution image into a target high-resolution image. Each of the original low-resolution image and the target high-resolution image processed by the image processing apparatus 100 may denote digital image data.

The first image processor may up-sample the original low-resolution image on the basis of deep learning-based learning data to generate a first high-resolution image. The first image processor may up-sample the original low-resolution image by using a convolutional neural network (CNN) as in FIG. 2, and thus, may generate the first high-resolution image similar to the target high-resolution image. A deep learning technique illustrated in FIG. 2 may be merely an embodiment, and a deep learning technique used in the first image processor is not limited to FIG. 2. In the CNN of FIG. 2, learning data may consist of an image pair including a learning low-resolution image (ILR) and a learning high-resolution image (ISR).

The second image processor may interpolate the original low-resolution image through various known interpolation methods to generate a second high-resolution image.

The third image processor may generate a difference image between the first high-resolution image and the second high-resolution image, extract a high frequency component from the difference image, and amplify the extracted high frequency component. To this end, the third image processor may include an image subtractor (−) and an amplifier (xα). The image subtractor (−) may generate the difference image between the first high-resolution image and the second high-resolution image and may extract the high frequency component from the difference image. The amplifier (xα) may multiply the extracted high frequency component by a predetermined gain value (α) to amplify the extracted high frequency component, thereby increasing sharpness of an image. Sharpness may be enhanced as the gain value (α) increases within a threshold range where image distortion is minimized. However, the threshold range may vary based on the design spec, and thus, the gain value (α) may be designed to be adjustable.

The third image processor may further include a noise removal coring circuit COR which previously removes noise in the high frequency component in a process of extracting the high frequency component, before amplifying the extracted high frequency component. The noise removal coring circuit COR may remove noise concentrating near a threshold value (−th, th) of the high frequency component by using a coring algorithm as in FIG. 3, and thus, may prevent an increase in noise which is a side effect occurring when the amplifier (xα) amplifies the high frequency component. The third image processor may amplify only the high frequency component including no noise, and thus, sharpness of an image may be more effectively enhanced.

The fourth image processor may add the amplified high frequency component to the first high-resolution image to generate the target high-resolution image. The fourth image processor may include an image adder (+) which adds the amplified high frequency component to the first high-resolution image.

As described above, the image processing apparatus 100 according to an embodiment may freely adjust sharpness of an image without relearning in the deep learning-based SR technology. The image processing apparatus 100 according to an embodiment may apply deep learning technology based on an arbitrary structure and may not need a memory for storing relearning content. The image processing apparatus 100 according to an embodiment may not need a relearning process, and thus, a time taken in resolution conversion and sharpness adjustment may be effectively reduced. Because the image processing apparatus 100 according to an embodiment uses a high frequency component extracted in deep learning-based SR technology, an additional sharpness enhancement algorithm may not be needed. Accordingly, a logic algorithm for resolution conversion and sharpness adjustment may be simplified.

Figure 4:
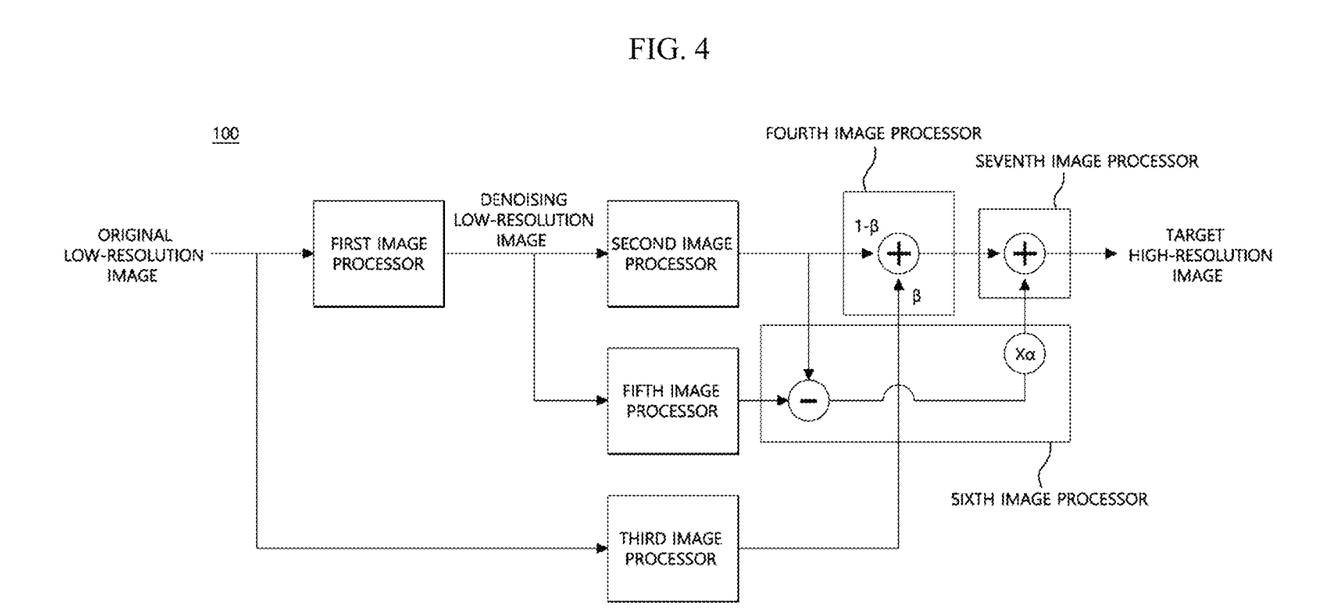
FIG. 4 is a diagram illustrating an image processing apparatus according to another embodiment of the present disclosure.

FIG. 4 is a diagram illustrating an image processing apparatus 200 according to another embodiment of the present disclosure.

Referring to FIG. 4, the image processing apparatus 200 according to another embodiment may freely adjust sharpness of a high-resolution image without relearning, and moreover, because input noise may be amplified by deep learning-based SR technology when an original low-resolution image includes much input noise, the image processing apparatus 200 may be for more solving such a problem. The image processing apparatus 200 according to another embodiment may apply denosing technology to an original low-resolution image to remove input noise and may apply SR technology to a noise-removed image to generate the first high-resolution image without amplifying the input noise. In this case, because loss may occur in details of an original low-resolution image by applying denoising, the image processing apparatus 200 may apply the SR technology to an original low-resolution image, to which denoising is not applied, to further generate the second high-resolution image and may weighted-average the first and second high-resolution images, thereby preventing an increase in noise and minimizing loss of image details.

To this end, the image processing apparatus 200 according to another embodiment may include a first image processor, a second image processor, a third image processor, a fourth image processor, a fifth image processor, a sixth image processor, and a seventh image processor and may convert an original low-resolution image into a target high-resolution image. Each of the original low-resolution image and the target high-resolution image processed by the image processing apparatus 200 may denote digital image data.

The first image processor may include a known denoising circuit and may remove input noise included in an original low-resolution image. Also, the first image processor generates a denoising low-resolution image from which the input noise is removed from the original low-resolution image.

The second image processor may up-sample the denoising original low-resolution image on the basis of deep learning-based learning data to generate a first high-resolution image. The second image processor may up-sample the denoising low-resolution image by using the CNN as in FIG. 2, and thus, may generate the first high-resolution image similar to the target high-resolution image. The deep learning technique illustrated in FIG. 2 may be merely an embodiment, and a deep learning technique used in the second image processor is not limited to FIG. 2. In the CNN of FIG. 2, learning data may consist of an image pair including a learning low-resolution image (ILR) and a learning high-resolution image (ISR).

The third image processor may up-sample the original low-resolution image, to which denoising is not applied, to generate the second high-resolution image, on the basis of deep learning-based learning data. The third image processor may up-sample the original low-resolution image by using the CNN as in FIG. 2, and thus, may generate the second high-resolution image similar to the target high-resolution image.

The fourth image processor may weighted-average the first high-resolution image and the second high-resolution image to generate a third high-resolution image. The fourth image processor may multiply the first high-resolution image by a first weight to calculate a first weighting result and may multiply the second high-resolution image by a second weighting to calculate a second weighting result. Also, the fourth image processor may average the first weighting result and the second weighting result to generate the third high-resolution image. Here, a sum of the first weight and the second weight may be 1. For example, when the first weight is "1−β", the second weight may be "β".

The fifth image processor may interpolate the denoising low-resolution image through various known interpolation methods to generate a fourth high-resolution image.

The sixth image processor may generate a difference image between the first high-resolution image and the fourth high-resolution image, extract a high frequency component from the difference image, and amplify the extracted high frequency component. To this end, the sixth image processor may include an image subtractor (−) and an amplifier (xα). The image subtractor (−) may generate the difference image between the first high-resolution image and the fourth high-resolution image and may extract the high frequency component from the difference image. The amplifier (xα) may multiply the extracted high frequency component by the predetermined gain value (α) to amplify the extracted high frequency component, thereby increasing sharpness of an image. Sharpness may be enhanced as the gain value (α) increases within a threshold range where image distortion is minimized. However, the threshold range may vary based on the design spec, and thus, the gain value (α) may be designed to be adjustable.

The sixth image processor may further include a noise removal coring circuit which previously removes noise in the high frequency component in a process of extracting the high frequency component, before amplifying the extracted high frequency component. The noise removal coring circuit may remove noise concentrating near a threshold value (−th, th) of the high frequency component by using the coring algorithm as in FIG. 3, and thus, may prevent an increase in noise which is a side effect occurring when the amplifier (xα) amplifies the high frequency component. The third image processor may amplify only the high frequency component including no noise, and thus, sharpness of an image may be more effectively enhanced.

However, because the first high-resolution image and the fourth high-resolution image input to the sixth image processor are based on a denoised low-resolution image, the noise removal coring circuit may be omitted in the sixth image processor. In the embodiment of FIG. 4, the noise removal coring circuit may be included in the sixth image processor.

The seventh image processor may add the amplified high frequency component to the third high-resolution image to generate the target high-resolution image. The seventh image processor may include an image adder (+) which adds the amplified high frequency component to the third high-resolution image.

As described above, the image processing apparatus 200 according to another embodiment may freely adjust sharpness of an image without relearning in the deep learning-based SR technology. The image processing apparatus 200 according to another embodiment may apply deep learning technology based on an arbitrary structure and may not need a memory for storing relearning content. The image processing apparatus 200 according to another embodiment may not need a relearning process, and thus, a time taken in resolution conversion and sharpness adjustment may be effectively reduced. Because the image processing apparatus 200 according to another embodiment uses a high frequency component extracted in deep learning-based SR technology, an additional sharpness enhancement algorithm may not be needed. Accordingly, a logic algorithm for resolution conversion and sharpness adjustment may be simplified. The image processing apparatus 200 according to another embodiment may prevent an input noise component from being amplified and may minimize loss of details of an original image.

Figure 5:
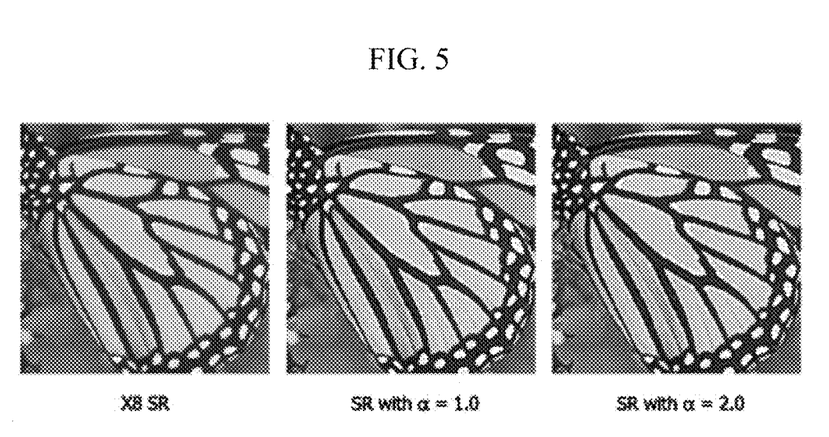
FIG. 5 is a diagram illustrating, through comparison, a sharpness enhancement effect based on the application or not of technology concept according to the present disclosure, in converting a low-resolution image into a high-resolution image which is eight times higher.

FIG. 5 is a diagram illustrating, through comparison, a sharpness enhancement effect based on the application or not of technology concept according to the present disclosure, in converting a low-resolution image into a high-resolution image which is eight times higher.

Referring to FIG. 5, comparing with simple SR technology (X8 SR) to which the inventive concept is not applied, it may be seen that sharpness of a target high-resolution image is more enhanced in a case (SR with α=1.0, SR with α=2.0) where the inventive concept is applied. Based on such a simulation result, an effect of the inventive concept may be easily confirmed.

Figure 6:
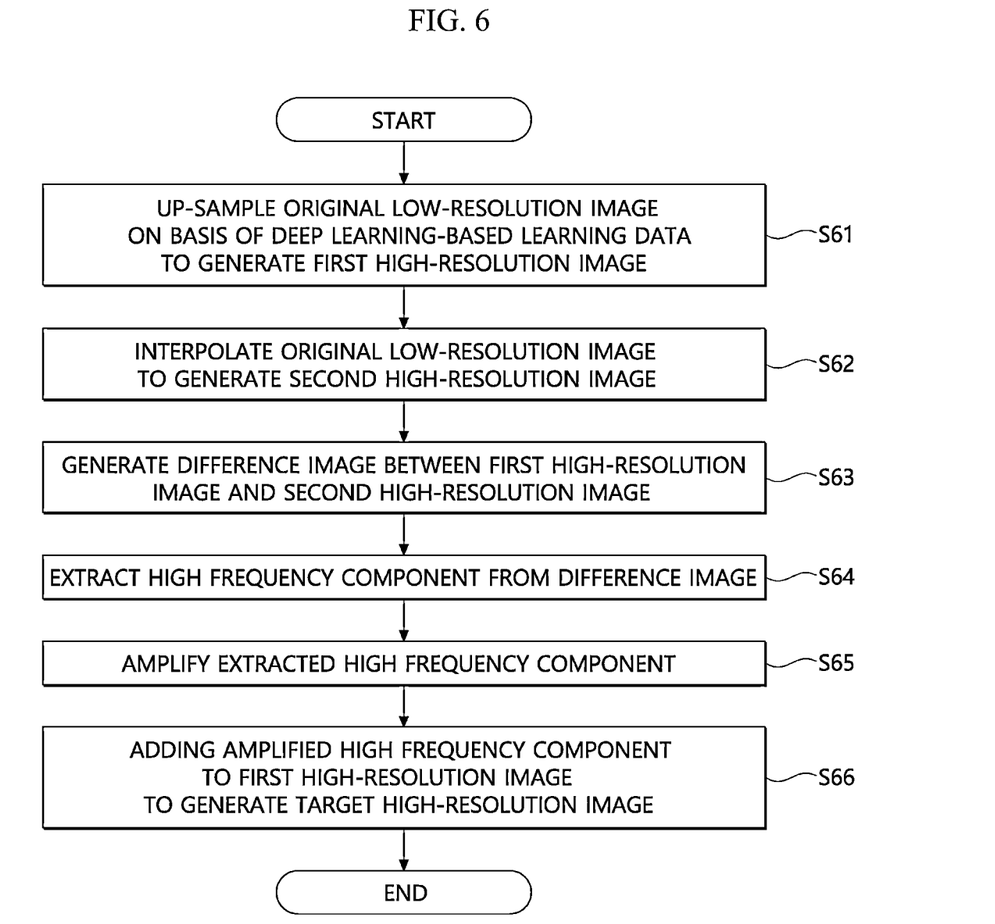
FIG. 6 is a diagram illustrating an image processing method according to an embodiment of the present disclosure.

FIG. 6 is a diagram illustrating an image processing method according to an embodiment of the present disclosure.

Referring to FIG. 6, the image processing method according to an embodiment of the present disclosure may include a step S61 of up-sampling an original low-resolution image on the basis of deep learning-based learning data to generate a first high-resolution image, a step S62 of interpolating the original low-resolution image to generate a second high-resolution image, a step S63 of generating a difference image between the first high-resolution image and the second high-resolution image, a step S64 of extracting a high frequency component from the difference image, a step S65 of amplifying the extracted high frequency component, and a step S66 of adding the amplified high frequency component to the first high-resolution image to generate a target high-resolution image.

The image processing method according to an embodiment of the present disclosure may further include a noise removal step performed between the step S64 and the step S65. The noise removal step may be a step of removing noise concentrating near a threshold value of the extracted high frequency component on the basis of the predetermined coring algorithm before the extracted high frequency component is amplified.

In the step S65 of amplifying the extracted high frequency component, the extracted high frequency component may be multiplied by a predetermined gain value.

The image processing method according to an embodiment of the present disclosure may further include a step of previously removing noise included in the extracted high frequency component before the extracted high frequency component is amplified.

Figure 7:
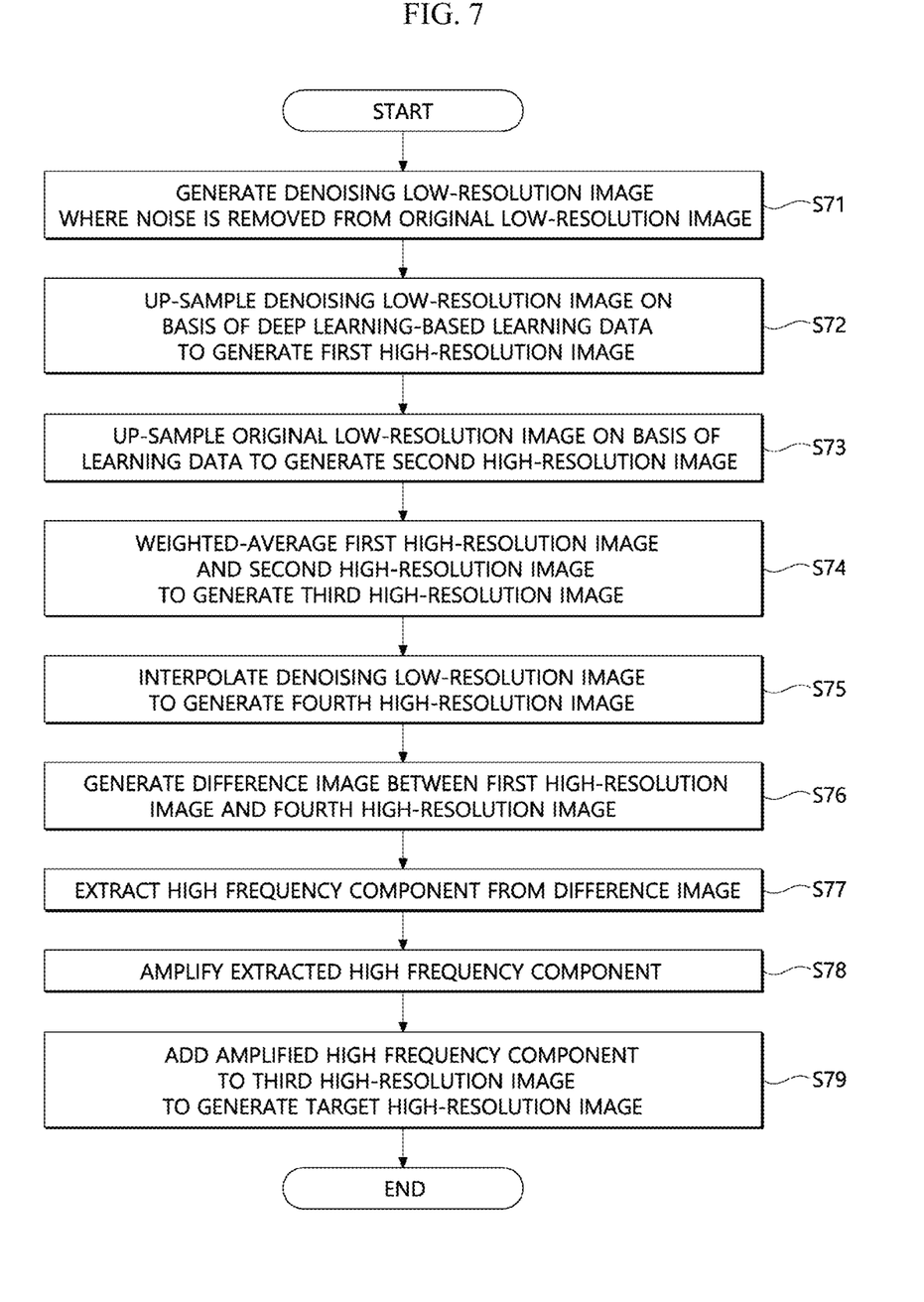
FIG. 7 is a diagram illustrating an image processing method according to another embodiment of the present disclosure.

FIG. 7 is a diagram illustrating an image processing method according to another embodiment of the present disclosure.

Referring to FIG. 7, the image processing method according to another embodiment of the present disclosure may include a step S71 of generating a denoising low-resolution image where noise is removed from the original low-resolution image, a step S72 of up-sampling the denoising low-resolution image on the basis of deep learning-based learning data to generate a first high-resolution image, a step S73 of up-sampling the original low-resolution image on the basis of the learning data to generate the second high-resolution image, a step S74 of weighted-averaging the first high-resolution image and the second high-resolution image to generate a third high-resolution image, a step S75 of interpolating the denoising low-resolution image to generate a fourth high-resolution image, a step S76 of generating a difference image between the first high-resolution image and the fourth high-resolution image, a step S77 of extracting a high frequency component from the difference image, a step S78 of amplifying the extracted high frequency component, and a step S79 of adding the amplified high frequency component to the third high-resolution image to generate the target high-resolution image.

The image processing method according to another embodiment of the present disclosure may further include a noise removal step performed between the step S77 and the step S78. The noise removal step may be a step of removing noise concentrating near a threshold value of the extracted high frequency component on the basis of the predetermined coring algorithm before the extracted high frequency component is amplified.

The step S74 of weighted-averaging the first high-resolution image and the second high-resolution image to generate the third high-resolution image may include a step of multiplying the first high-resolution image by a first weight to calculate a first weighting result, a step of multiplying the second high-resolution image by a second weighting to calculate a second weighting result, and a step of averaging the first weighting result and the second weighting result to generate the third high-resolution image. Here, a sum of the first weight and the second weight may be 1.

In the step S78 of amplifying the extracted high frequency component, the extracted high frequency component may be multiplied by a predetermined gain value.

The image processing method according to another embodiment of the present disclosure may further include a step of previously removing noise included in the extracted high frequency component before the extracted high frequency component is amplified.

Figure 8:
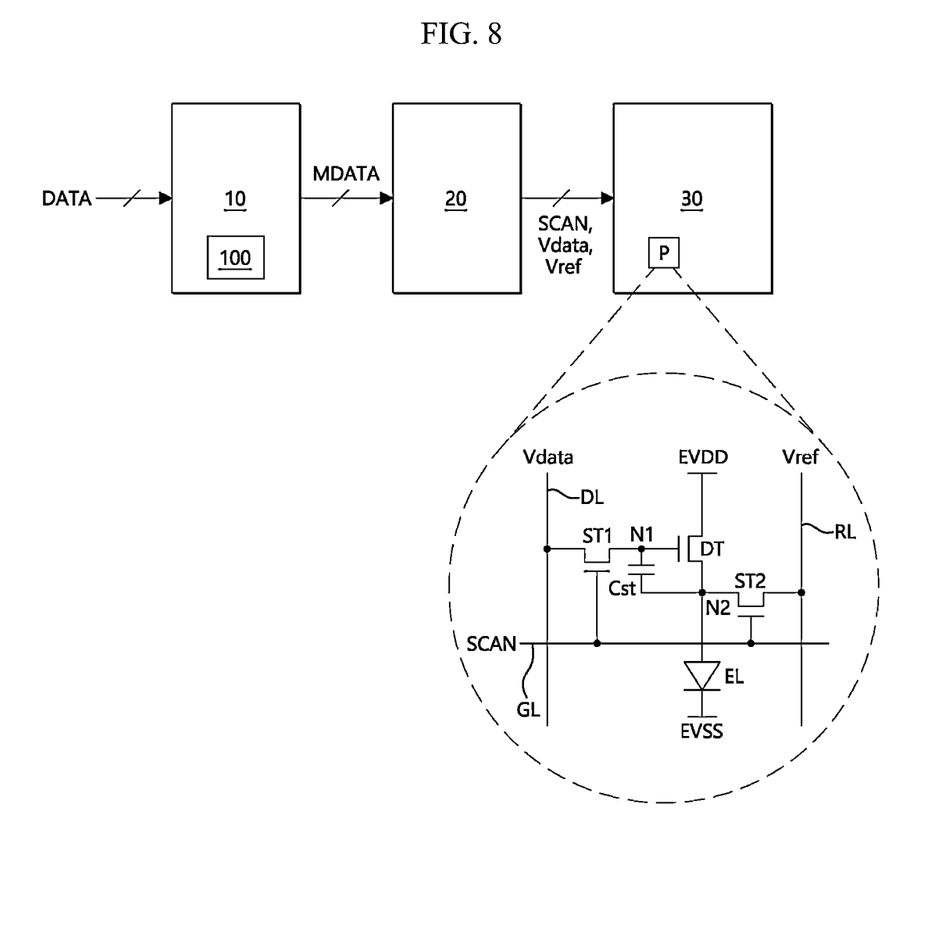
FIG. 8 is a diagram illustrating a display apparatus based on image processing technology of FIGS. 1 to 7.

FIG. 8 is a diagram illustrating a display apparatus based on image processing technology of FIGS. 1 to 7.

Referring to FIG. 8, the display apparatus may be an electroluminescent display apparatus, but is not limited thereto and may be applied to various types of display apparatuses. For example, the display apparatus may be implemented as various types such as a liquid crystal display apparatus, an electrophoretic display apparatus, an electrowetting display apparatus, and a quantum dot light emitting display apparatus.

The display apparatus may include a controller 10, a panel driver 20, and a display panel 30.

The display panel 30 may include a screen configured with a plurality of pixel lines and may include a plurality of pixels P in each pixel line. Here, a "pixel line" may denote a set of signal lines and pixels PXL adjacent to one another in a horizontal direction, instead of a physical signal line. The signal lines may include data lines DL for transferring data voltages Vdata to the pixels P, reference voltage lines RL for transferring a reference voltage Vref to the pixels P, gate lines GL for transferring a scan signal to the pixels P, and high level power lines for transferring a high level pixel voltage EVDD to the pixels P. in order to apply ACL described below, the reference voltage lines RL may be separated from one another by pixel line units.

The pixels P of the display panel 30 may be arranged as a matrix type to configure a pixel array and may provide a screen which displays an image. Each of the pixels P may be connected to one of the data lines DL, one of the reference voltage lines RL, one of the high level power lines, and one of the gate lines GL. Each pixel P may be further supplied with a low level pixel voltage EVSS from the panel driver 20.

Each pixel P may include a light emitting device EL, a driving TFT DT, switch TFTs ST1 and ST2, and a storage capacitor Cst, but is not limited thereto. Each of the driving TFT DT and the switch TFTs ST1 and ST2 may be implemented as an NMOS transistor, but is not limited thereto.

The light emitting device EL may be a light emitting device which emits light corresponding to a pixel current transferred from the driving TFT DT. The light emitting device EL may be implemented with an organic light emitting diode including an organic emission layer, or may be implemented with an inorganic light emitting diode including an inorganic emission layer. An anode electrode of the light emitting device EL may be connected to a second node N2, and a cathode electrode thereof may be connected to an input terminal for the low level pixel voltage EVSS.

The driving TFT DT may be a driving element which generates a pixel current corresponding to a gate-source voltage thereof. A gate electrode of the driving TFT DT may be connected to a first node N1, a first electrode thereof may be connected to an input terminal for the high level pixel voltage EVDD through the high level power line, and a second electrode thereof may be connected to the second node N2.

The switch TFTs ST1 and ST2 may be switch elements which set the gate-source voltage of the driving TFT DT and connect the second electrode of the driving TFT DT to the reference voltage line RL.

The first switch TFT ST1 may be connected between a data line DL and the first node N1 and may be turned on based on a scan signal SCAN from a gate line GL. The first switch TFT ST1 may be turned on in programming for image driving. When the first switch TFT ST1 is turned on, a data voltage Vdata may be applied to the first node N1. A gate electrode of the first switch TFT ST1 may be connected to the gate line GL, a first electrode thereof may be connected to the data line DL, and a second electrode thereof may be connected to the first node N1.

The second switch TFT ST2 may be connected between a reference voltage line RL and the second node N2 and may be turned on based on the scan signal SCAN from the gate line GL. The second switch TFT ST2 may be turned on in programming for image driving, the reference voltage Vref may be applied to the second node N2. A gate electrode of the second switch TFT ST2 may be connected to the gate line GL, a first electrode thereof may be connected to the reference voltage line RL, and a second electrode thereof may be connected to the second node N2.

The storage capacitor Cst may be connected between the first node N1 and the second node N2 and may hold the gate-source voltage of the driving TFT DT during a certain duration.

The controller 10 may include a timing controller.

The timing controller may control an operation timing of the panel driver 20 on the basis of timing signals (for example, a vertical synchronization signal Vsync, a horizontal synchronization signal Hsync, a dot clock signal DCLK, and a data enable signal DE) from a host system.

The image processing apparatuses 100 and 200 of FIGS. 1 and 4 may be embedded in the controller 10, but are not limited thereto. Each of the image processing apparatuses 100 and 200 of FIGS. 1 and 4 may be independently mounted as a separate logic circuit on a printed circuit board (PCB) with the controller 10 mounted thereon. The image processing apparatuses 100 and 200 may be as described above with reference to FIGS. 1 and 4 and may convert original low-resolution video data DATA, input from the host system, into target high-resolution image data MDATA. The controller 10 may supply the panel driver 20 with the target high-resolution image data MDATA generated by the image processing apparatuses 100 and 200.

The panel driver 20 may drive the pixels P included in the screen of the display panel 30. The panel driver 20 may include a data driver which drives the data lines DL connected to the pixels P, a gate driver which drives the gate lines GL connected to the pixels P, and a power driver which drives the reference voltage lines RL connected to the pixels P and the high level power lines connected the pixels P.

The gate driver may generate the scan signal SCAN on the basis of control by the controller 10 and may provide the scan signal SCAN to the screen on the basis of a supply timing of the target high-resolution image data MDATA. The scan signal SCAN may be supplied to the screen through the gate line GL, and thus, a pixel line to which the target high-resolution image data MDATA is to be supplied may be selected. The gate driver may be directly provided in a non-display area outside the screen of the display panel 30.

The data driver may convert the target high-resolution image data MDATA into the data voltage Vdata on the basis of control by the controller 10 and may provide the data voltage Vdata to the screen. The data voltage Vdata may be supplied to the screen through the data line DL.

The image processing apparatus, the image processing method, and the display apparatus based on the same according to the embodiments of the present disclosure may freely adjust sharpness of an image without relearning in the deep learning-based SR technology.

The image processing apparatus, the image processing method, and the display apparatus based on the same according to the embodiments of the present disclosure may previously remove noise in a high frequency component in a process of extracting the high frequency component before amplifying the high frequency component, thereby preventing an increase in noise and more enhancing sharpness of an image.

It will be apparent to those skilled in the art that various modifications and variations can be made in the image processing apparatus, the image processing method, and the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. An image processing apparatus comprising:
a first image processor configured to up-sample an original low-resolution image on the basis of deep learning-based learning data to generate a first high-resolution image;
a second image processor configured to interpolate the original low-resolution image to generate a second high-resolution image;
a third image processor configured to generate a difference image between the first high-resolution image and the second high-resolution image, extract a high frequency component from the difference image, and amplify the extracted high frequency component; and
a fourth image processor configured to add the amplified high frequency component to the first high-resolution image to generate a target high-resolution image.

2. The image processing apparatus of claim 1, wherein the third image processor multiplies the extracted high frequency component by a predetermined gain value to generate the amplified high frequency component.

3. The image processing apparatus of claim 1, wherein the learning data comprises an image pair including a learning low-resolution image and a learning high-resolution image.

4. The image processing apparatus of claim 1, wherein the third image processor further comprises a coring circuit removing noise concentrating near a threshold value of the extracted high frequency component on the basis of a predetermined coring algorithm before the extracted high frequency component is amplified.

5. An image processing apparatus comprising:
a first image processor configured to generate a denoising low-resolution image where noise is removed from an original low-resolution image;
a second image processor configured to up-sample the denoising low-resolution image on the basis of deep learning-based learning data to generate a first high-resolution image;
a third image processor configured to up-sample the original low-resolution image on the basis of the learning data to generate a second high-resolution image;
a fourth image processor configured to weighted-average the first high-resolution image and the second high-resolution image to generate a third high-resolution image;
a fifth image processor configured to interpolate the denoising low-resolution image to generate a fourth high-resolution image;
a sixth image processor configured to generate a difference image between the first high-resolution image and the fourth high-resolution image, extract a high frequency component from the difference image, and amplify the extracted high frequency component; and
a seventh image processor configured to add the amplified high frequency component to the third high-resolution image to generate a target high-resolution image.

6. The image processing apparatus of claim 5, wherein the fourth image processor multiplies the first high-resolution image by a first weight to calculate a first weighting result, multiplies the second high-resolution image by a second weight to calculate a second weighting result, and averages the first weighting result and the second weighting result to generate the third high-resolution image, and
a sum of the first weight and the second weight is 1.

7. The image processing apparatus of claim 5, wherein the sixth image processor multiplies the extracted high frequency component by a predetermined gain value to generate the amplified high frequency component.

8. The image processing apparatus of claim 5, wherein the sixth image processor further comprises a coring circuit removing noise concentrating near a threshold value of the extracted high frequency component on the basis of a predetermined coring algorithm before the extracted high frequency component is amplified.

9. An image processing method comprising:
up-sampling an original low-resolution image on the basis of deep learning-based learning data to generate a first high-resolution image;
interpolating the original low-resolution image to generate a second high-resolution image;
generating a difference image between the first high-resolution image and the second high-resolution image, extracting a high frequency component from the difference image, and amplifying the extracted high frequency component; and
adding the amplified high frequency component to the first high-resolution image to generate a target high-resolution image.

10. The image processing method of claim 9, wherein the amplifying the extracted high frequency component comprises multiplying the extracted high frequency component by a predetermined gain value.

11. The image processing method of claim 9, further comprising removing noise concentrating near a threshold value of the extracted high frequency component on the basis of a predetermined coring algorithm before the extracted high frequency component is amplified.

12. An image processing method comprising:
generating a denoising low-resolution image where noise is removed from an original low-resolution image;
up-sampling the denoising low-resolution image on the basis of deep learning-based learning data to generate a first high-resolution image;
up-sampling the original low-resolution image on the basis of the learning data to generate a second high-resolution image;
weighted-averaging the first high-resolution image and the second high-resolution image to generate a third high-resolution image;
interpolating the denoising low-resolution image to generate a fourth high-resolution image;
generating a difference image between the first high-resolution image and the fourth high-resolution image, extracting a high frequency component from the difference image, and amplifying the extracted high frequency component; and
adding the amplified high frequency component to the third high-resolution image to generate a target high-resolution image.

13. The image processing method of claim 12, wherein the weighted-averaging the first high-resolution image and the second high-resolution image comprises:
   multiplying the first high-resolution image by a first weight to calculate a first weighting result;
   multiplying the second high-resolution image by a second weight to calculate a second weighting result; and
   averaging the first weighting result and the second weighting result to generate the third high-resolution image, and
   a sum of the first weight and the second weight is 1.

14. The image processing method of claim 12, wherein the amplifying the extracted high frequency component comprises multiplying the extracted high frequency component by a predetermined gain value.

15. The image processing method of claim 12, further comprising removing noise concentrating near a threshold value of the extracted high frequency component on the basis of a predetermined coring algorithm before the extracted high frequency component is amplified.

16. A display apparatus comprising the image processing apparatus of claim 1.

17. A display apparatus comprising the image processing apparatus of claim 5.

* * * * *